(12) United States Patent
Lee et al.

(10) Patent No.: US 12,505,876 B2
(45) Date of Patent: Dec. 23, 2025

(54) LAYOUT STRUCTURE FORMING METHOD OF SENSE AMPLIFIER AND LAYOUT STRUCTURE OF SENSE AMPLIFIER

(71) Applicant: CHANGXIN MEMORY TECHNOLOGIES, INC., Hefei (CN)

(72) Inventors: Tzung-Han Lee, Hefei (CN); Chih-Cheng Liu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 821 days.

(21) Appl. No.: 17/808,130

(22) Filed: Jun. 22, 2022

(65) Prior Publication Data
US 2023/0013579 A1    Jan. 19, 2023

(30) Foreign Application Priority Data
Jul. 19, 2021 (CN) .......................... 202110814845.4

(51) Int. Cl.
*G11C 11/417* (2006.01)
*G11C 11/412* (2006.01)
*H10B 10/00* (2023.01)

(52) U.S. Cl.
CPC .......... *G11C 11/417* (2013.01); *G11C 11/412* (2013.01); *H10B 10/12* (2023.02)

(58) Field of Classification Search
CPC ..................................................... H10B 10/12
See application file for complete search history.

(56) References Cited

U.S. PATENT DOCUMENTS 6,657,302 B1 * 12/2003 Shao .................. H01L 23/5226
                                                     438/622
6,909,196 B2 *  6/2005 Batra ..................... H01L 24/05
                                                     257/784

(Continued)

FOREIGN PATENT DOCUMENTS

CN        105762135 A      7/2016
CN        105825879 A      8/2016

(Continued)

OTHER PUBLICATIONS

TW Office Action cited in TW111125196, mailed Aug. 17, 2023, 8 pages.

(Continued)

*Primary Examiner* — William A Harriston
(74) *Attorney, Agent, or Firm* — Kilpatrick Townsend & Stockton LLP

(57) ABSTRACT

The present disclosure relates to a layout structure forming method of a sense amplifier and a layout structure of a sense amplifier. The method includes: providing a first active region layout structure layer, the first metal contact pattern layer includes a first metal contact pattern and a second metal contact pattern that are located on two opposite sides of the first pattern region; the first conductive wire pattern layer includes a first conductive wire pattern covering the first metal contact pattern and the second metal contact pattern; and the first connection hole pattern layer includes a plurality of connection hole designs, and the connection hole designs are connected to form a connection structure connected to the first metal contact pattern layer.

17 Claims, 6 Drawing Sheets

(56) References Cited

U.S. PATENT DOCUMENTS

| | | | |
|---|---|---|---|
| 9,202,531 | B2 | 12/2015 | Seo |
| 10,522,215 | B2 | 12/2019 | Li et al. |
| 11,348,926 | B2 | 5/2022 | Liaw |
| 11,996,399 | B2 * | 5/2024 | Chen ................... H01L 25/0657 |
| 2003/0234448 | A1 * | 12/2003 | Batra .................. H01L 23/5222 |
| | | | 257/758 |
| 2003/0235018 | A1 | 12/2003 | Batra et al. |
| 2018/0182449 | A1 | 6/2018 | Kim et al. |

FOREIGN PATENT DOCUMENTS

| | | |
|---|---|---|
| KR | 102070977 B1 | 1/2020 |
| TW | 201911310 A | 3/2019 |

OTHER PUBLICATIONS

Li Zhang et al., Research and Design of Tolerance Deviation Sensitive Amplifier, Computer & Digital Engineering, 47 (11): 2667-2670, Nov. 30, 2019, 4 pages.

The First Office Action issued in Chinese corresponding application No. 202110814845.4 mailed on Jun. 27, 2025, 21 pages.

* cited by examiner

LAYOUT STRUCTURE FORMING METHOD OF SENSE AMPLIFIER AND LAYOUT STRUCTURE OF SENSE AMPLIFIER

CROSS-REFERENCE TO RELATED APPLICATION

This disclosure claims the priority of Chinese Patent Application No. 202110814845.4, submitted to the Chinese Intellectual Property Office on Jul. 19, 2021, the disclosure of which is incorporated herein in its entirety by reference.

BACKGROUND

With the rapid development of integrated circuit processes, semiconductor products need to meet a higher integration requirement. As a result, the size of a single semiconductor device, a gap between adjacent conductive wires in the semiconductor device, and the width of a single conductive wire are required to be smaller. This leads to higher requirements on semiconductor processes, a higher risk of bridging shorts between adjacent conductive wires, and increased parasitic capacitance of conductive wires, thus affecting the efficiency of data transmission in semiconductor devices, and increasing the energy consumption of semiconductor devices.

However, in the conventional integrated circuit products, a multi-layer process is relatively complex, which imposes high requirements on design rules for each layer of the layout structure. Pattern shapes on the layout structure are not uniform, resulting in high complexity of a lithography process.

SUMMARY

The present disclosure relates to the technical field of semiconductor manufacturing, and in particular, to a layout structure forming method of a sense amplifier, and a layout structure of a sense amplifier.

According to a first aspect, the present disclosure provides a layout structure forming method of a sense amplifier, including:
  providing a first active region layout structure layer, where the first active region layout structure layer includes a first pattern region for defining a first memory cell structure;
  forming a first metal contact pattern layer on an upper surface of the first active region layout structure layer, wherein the first metal contact pattern layer comprises a first metal contact pattern located at a first side of the first pattern region and a second metal contact pattern located at a second side of the first pattern region, the first side and the second side being two opposite sides of the first pattern region along a first direction;
  forming a first conductive wire pattern layer on an upper surface of the first metal contact pattern layer, wherein the first conductive wire pattern layer comprises a first conductive wire pattern, and the first conductive wire pattern extends along the first direction and covers the first metal contact pattern and the second metal contact pattern; and
  forming a first connection hole pattern layer on an upper surface of the first conductive wire pattern layer, wherein the first connection hole pattern layer comprises a plurality of connection hole designs, the connection hole designs are arranged in a one-to-one corresponding manner with transistors in the first memory cell structure, and the connection hole designs are connected to form a connection structure that is connected to the first metal contact pattern layer.

According to another aspect, the present disclosure provides a layout structure of a sense amplifier, including: a first active region layout structure layer, a first metal contact pattern layer, a first conductive wire pattern layer, and a first connection hole pattern layer, where the first active region layout structure layer includes a first pattern region for defining a first memory cell structure; the first metal contact pattern layer is located on an upper surface of the first active region layout structure layer, where the first metal contact pattern layer includes a first metal contact pattern located at a first side of the first pattern region and a second metal contact pattern located at a second side of the first pattern region, the first side and the second side being two opposite sides of the first pattern region along a first direction; the first conductive wire pattern layer is located on an upper surface of the first metal contact pattern layer, where the first conductive wire pattern layer includes a first conductive wire pattern, and the first conductive wire pattern extends along the first direction and covers the first metal contact pattern and the second metal contact pattern; and the first connection hole pattern layer is located on an upper surface of the first conductive wire pattern layer, where the first connection hole pattern layer includes a plurality of connection hole designs, the connection hole designs are arranged in a one-to-one corresponding manner with transistors in the first memory cell structure, and the connection hole designs are connected to form a connection structure that is connected to the first metal contact pattern layer.

BRIEF DESCRIPTION OF THE DRAWINGS

To better describe and illustrate the embodiments and/or examples of the applications disclosed herein, reference may be made to one or more accompanying drawings. Additional details or examples for describing the drawings should not be considered as limitations on the scope of any one of the disclosed applications, the currently described embodiment and/or example, and the optimal mode of the applications as currently understood.

DETAILED DESCRIPTION

Figure 1:
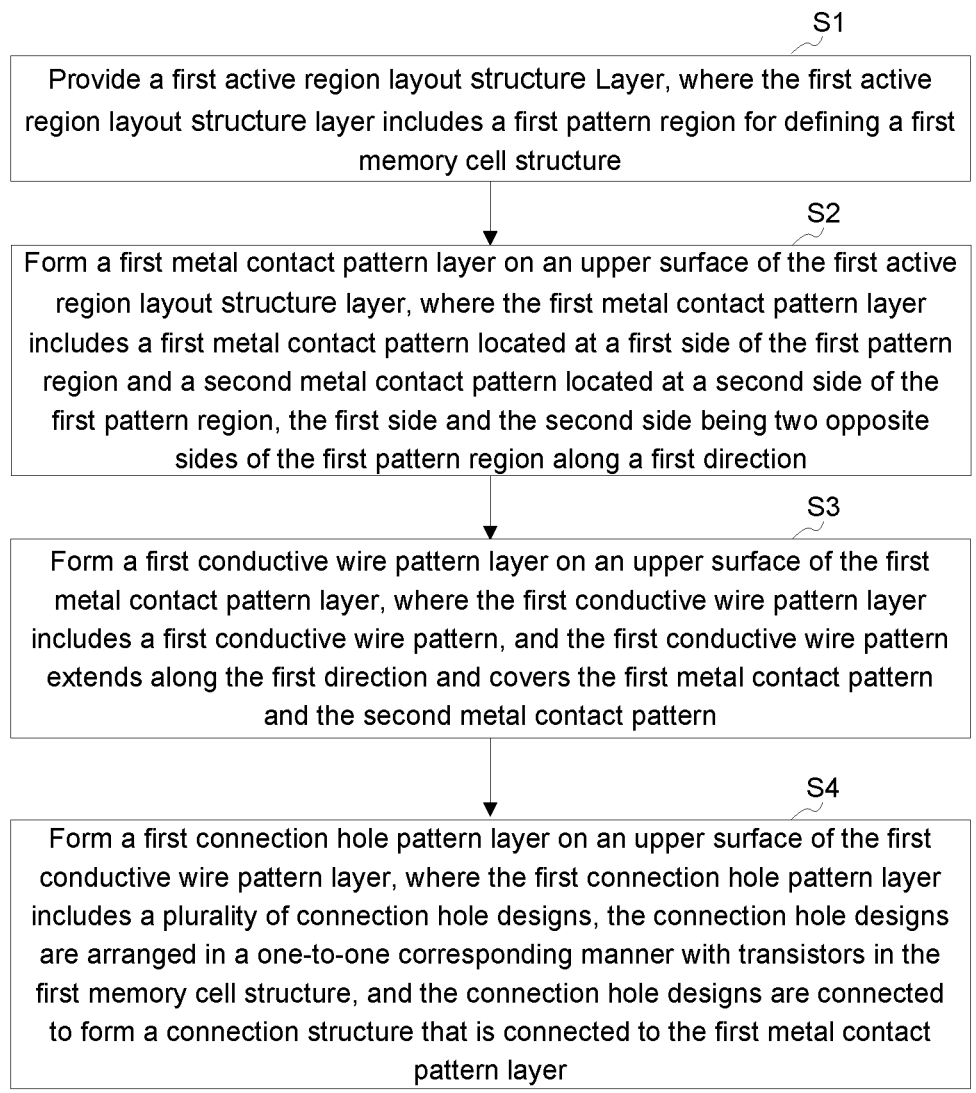
FIG. 1 is a schematic flowchart of a layout structure forming method of a sense amplifier according to an embodiment of the present disclosure.

To facilitate the understanding of the present disclosure, the present disclosure is described more completely below with reference to the accompanying drawings. The preferred embodiments of the present disclosure are shown in the accompanying drawings. However, the present disclosure may be embodied in various forms without being limited to the embodiments described herein. On the contrary, these embodiments are provided to make the present disclosure more thorough and comprehensive.

Unless otherwise defined, all technical and scientific terms used herein have the same meaning as commonly understood by those skilled in the technical field of the present disclosure. The terms mentioned herein are merely for the purpose of describing specific embodiments, rather than to limit the present disclosure. The term "and/or" used herein includes any and all combinations of one or more of the associated listed items.

It should be understood that when an element or layer is described as "being on", "being adjacent to", "being connected to" or "being coupled to" another element or layer, it can be on, adjacent to, connected to, or coupled to the another element or layer directly, or intervening elements or layers may be present. On the contrary, when an element is described as "being directly on", "being directly adjacent to", "being directly connected to" or "being directly coupled to" another element or layer, there are no intervening elements or layers. It should be understood that although terms such as first, second, and third may be used to describe various elements, components, regions, layers and/or sections, these elements, components, regions, layers and/or sections should not be limited by these terms. These terms are only used to distinguish one element, component, region, layer or section from another element, component, region, layer or section. Therefore, without departing from the teachings of the present disclosure, the first element, component, region, layer or section discussed below may a second element, component, region, layer or section.

Spatial relationship terms such as "under", "beneath", "lower", "below", "above", and "upper" can be used herein to conveniently describe the relationship shown in the figure between one element or feature and another element or feature. It should be understood that in addition to the orientations shown in the figure, the spatial relationship terms are intended to further include different orientations of used and operated devices. For example, if a device in the accompanying drawings is turned over, and then described as being "beneath another element", "below it", or "under it", the device or feature is oriented "on" the another element or feature. Therefore, the exemplary terms "beneath" and "under" may include two orientations of above and below. The device may be otherwise oriented (rotated by 90 degrees or other orientations), and the spatial description used herein is interpreted accordingly.

The purpose of the terms used herein is only to describe specific embodiments instead of being a limitation of the present disclosure. In this specification, the singular forms of "a", "an" and "the/this" also include plural forms, unless clearly indicated otherwise. It should also be understood that terms "include" and/or "comprise", when used in this specification, determine the presence of features, integers, steps, operations, elements and/or components, but do not exclude the presence or addition of one or more other features, integers, steps, operations, elements, components and/or groups. In this specification, the term "and/or" includes any and all combinations of related listed items.

The embodiments of the present disclosure are described herein with reference to cross-sectional views as schematic diagrams of the idealized embodiments (and intermediate structures) of the present disclosure. In this way, changes from the shown shape due to, for example, the manufacturing technology and/or tolerances can be expected. Therefore, the embodiments of the present disclosure should not be limited to the specific shapes of the regions shown herein, but include shape deviations due to, for example, manufacturing. The regions shown in the figure are schematic in nature, and their shapes are not intended to show the actual shapes of the regions of the device and limit the scope of the present disclosure.

Refer to FIG. 1 to FIG. 9b. It should be noted that, the drawings provided in this embodiment merely illustrate the basic concept of the present disclosure schematically. Although the drawings only show components related to the present disclosure rather than being drawn according to the quantities, shapes, and sizes of components in actual implementation, patterns, quantities, and proportions of components in actual implementation may be changed randomly, and the component layout structure may be more complex.

As shown in FIG. 1, an embodiment of the present disclosure provides a layout structure forming method of a sense amplifier, including the following steps:

Step S1: Provide a first active region layout structure layer, where the first active region layout structure layer includes a first pattern region for defining a first memory cell structure.

Step S2: Form a first metal contact pattern layer on an upper surface of the first active region layout structure layer, where the first metal contact pattern layer includes a first metal contact pattern located at a first side of the first pattern region and a second metal contact pattern located at a second side of the first pattern region, the first side and the second side being two opposite sides of the first pattern region along a first direction.

Step S3: Form a first conductive wire pattern layer on an upper surface of the first metal contact pattern layer, where the first conductive wire pattern layer includes a first conductive wire pattern, and the first conductive wire pattern extends along the first direction and covers the first metal contact pattern and the second metal contact pattern.

Step S4: Form a first connection hole pattern layer on an upper surface of the first conductive wire pattern layer, where the first connection hole pattern layer includes a plurality of connection hole designs, the connection hole designs are arranged in a one-to-one corresponding manner with transistors in the first memory cell structure, and the connection hole designs are connected to form a connection structure that is connected to the first metal contact pattern layer.

Specifically, further referring to FIG. 1, the first metal contact pattern layer is first formed on the upper surface of the first active region layout structure layer, where the first metal contact pattern layer includes the first metal contact pattern and the second metal contact pattern that are located on two opposite sides of the first pattern region along the first direction; then, the first conductive wire pattern layer is formed on the upper surface of the first metal contact pattern layer, where the first conductive wire pattern layer includes the first conductive wire pattern that extends along the first direction and covers the first metal contact pattern and the second metal contact pattern, such that the first connection hole pattern layer including a plurality of connection hole pattern designs is formed on the upper surface of the first conductive wire pattern layer. The connection hole designs are arranged in a one-to-one corresponding manner with transistors in the first memory cell structure, such that the connection hole designs are connected to form the connection structure that is connected to the first metal contact pattern layer. Because the first conductive wire pattern is connected to the connection structure through the connection hole design, the width of the first conductive wire pattern in the memory cell structure is increased, which reduces parasitic capacitance generated by conductive wires in a manufactured semiconductor device, improves the efficiency of data transmission in the semiconductor device, and reduces the energy consumption of the semiconductor device. With the first memory cell structure as a basic cell, a layout structure including the basic cell array is formed in a horizontal symmetrical manner and/or vertical symmetrical manner, which improves the uniformity of pattern shapes on the layout structure, reduces requirements on design rules for each layer of the layout structure, reduces the complexity of a lithography process, and expands a gap between adjacent conductive wires in a manufactured semiconductor product, such that the conductive wires are sufficiently copper-plated, thereby further reducing the resistance and parasitic capacitance of the conductive wires.

Figure 2:
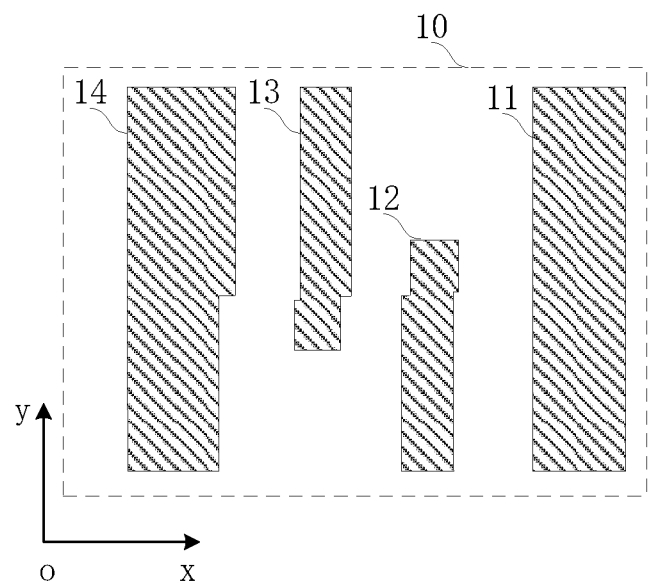
FIG. 2 to FIG. 3 are schematic top views of a layout structure obtained in step S1 of a layout structure forming method of a sense amplifier according to an embodiment of the present disclosure.

For example, referring to FIG. 2, in an embodiment of the present disclosure, the providing a first active region layout structure layer includes:

providing a first active region pattern layer, where the first active region pattern layer comprises a first active region pattern 11, a second active region pattern 12, a third active region pattern 13, and a fourth active region pattern 14 that are sequentially arranged along the first direction, e.g., direction ox;

forming a second connection hole pattern layer on an upper surface of the first active region pattern layer; and forming a gate strip pattern layer on an upper surface of the second connection hole pattern layer, where the gate strip pattern layer includes a first gate strip pattern 41, a second gate strip pattern 42, a third gate strip pattern 43, and a fourth gate strip pattern 44; the first gate strip pattern 41 and the third gate strip pattern 43 are sequentially arranged at an interval along the first direction; the second gate strip pattern 42 and the fourth gate strip pattern 44 are sequentially arranged at an interval along the first direction; the first gate strip pattern 41 and the second gate strip pattern 42 are sequentially arranged at an interval along a second direction, e.g., direction oy; the third gate strip pattern 43 and the fourth gate strip pattern 44 are sequentially arranged at an interval along the second direction; the first active region pattern 11 overlaps with the third gate strip pattern 43 and the fourth gate strip pattern 44; the second active region pattern 12 overlaps with the first gate strip pattern 41 and the fourth gate strip pattern 44; the third active region pattern 13 overlaps with the first gate strip pattern 41 and the fourth gate strip pattern 44; the fourth active region pattern 14 overlaps with the first gate strip pattern 41 and the second gate strip pattern 42.

Figure 3:
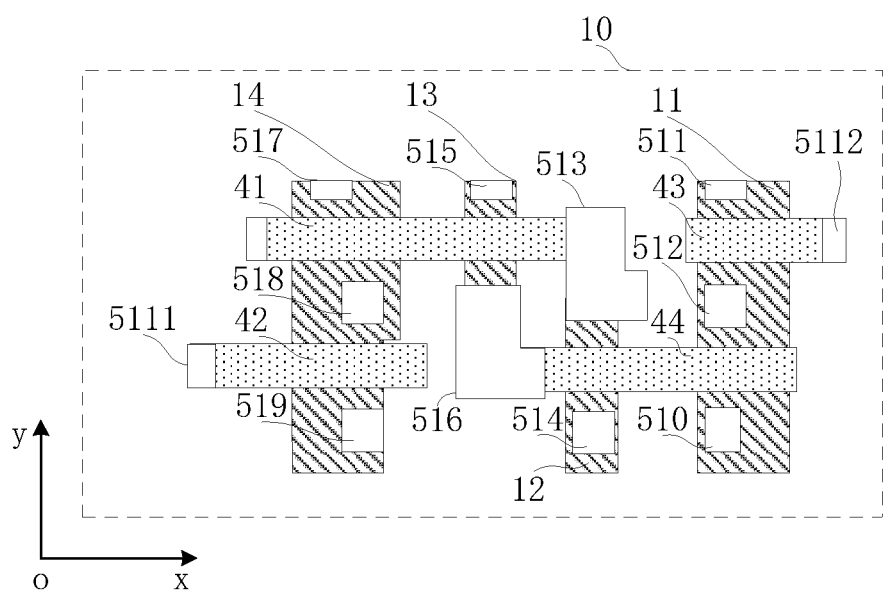
Figure 4:
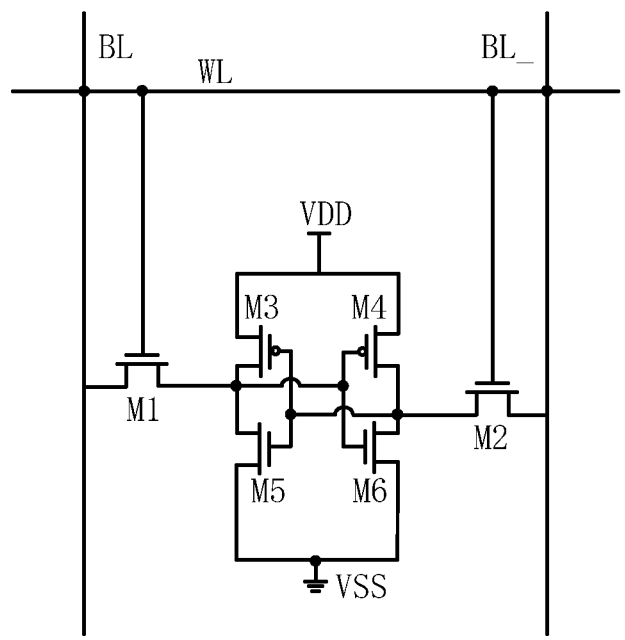
FIG. 4 is a schematic diagram of a memory cell circuit according to an embodiment of the present disclosure.

For example, referring to FIG. 3 and FIG. 4, in an embodiment of the present disclosure, the first gate strip pattern 41 and the fourth active region pattern 14, which is located at both sides of the first gate strip pattern 41 along the second direction, e.g., direction oy, are used for forming a fifth MOS transistor M5; the second gate strip pattern 42 and the fourth active region pattern 14, which is located at both sides of the second gate strip pattern 42 along the second direction, are used for forming a first MOS transistor M1; the first gate strip pattern 41 and the third active region pattern 13, which is located at both sides of the first gate strip pattern 41 along the second direction, are used for forming a third MOS transistor M3; the fourth gate strip pattern 44 and the second active region pattern 12, which is located at both sides of the fourth gate strip pattern 44 along the second direction, are used for forming a fourth MOS transistor M4; the third gate strip pattern 43 and the first active region pattern 11, which is located at both sides of the third gate strip pattern 43 along the second direction, are used for forming a second MOS transistor M2; the fourth gate strip pattern 44 and the first active region pattern 11, which is located at both sides of the fourth gate strip pattern 44 along the second direction, are used for forming a sixth MOS transistor M6.

For example, further referring to FIG. 3, in an embodiment of the present disclosure, the second connection hole pattern layer includes a first connection hole pattern 511, a second connection hole pattern 512, a third connection hole pattern 513, a fourth connection hole pattern 514, a fifth connection hole pattern 515, a sixth connection hole pattern 516, a seventh connection hole pattern 517, an eighth connection hole pattern 518, a ninth connection hole pattern 519, a tenth connection hole pattern 510, an eleventh connection hole pattern 5111, and a twelfth connection hole pattern 5112. The first connection hole pattern 511 is located in the first active region pattern 11 at a side of the third gate strip pattern 43 that is away from the fourth gate strip pattern 44; the second connection hole pattern 512 is located in the first active region pattern 11 between the third gate strip pattern 43 and the fourth gate strip pattern 44; the second active region pattern 12 overlaps with the first gate strip pattern 41 to form a first overlapping region, and the third connection hole pattern 513 covers the first overlapping region; the fourth connection hole pattern 514 is located in the second active region pattern 12 at a side of the fourth gate strip pattern 44 that is away from the first gate strip pattern 41; the fifth connection hole pattern 515 is located in the third active region pattern 13 at a side of the first gate strip pattern 41 that is away from the fourth gate strip pattern 44; the third active region pattern 13 overlaps with the fourth gate strip pattern 44 to form a second overlapping region, and the sixth connection hole pattern 516 covers the second overlapping region; the seventh connection hole pattern 517 is located in the fourth active region pattern 14 at a side of the first gate strip pattern 41 that is away from the second gate strip pattern 42; the eighth connection hole pattern 518 is located in the fourth active region pattern 14 between the first gate strip pattern 41 and the second gate strip pattern 42; the ninth connection hole pattern 519 is located in the fourth active region pattern 14 at a side of the second gate strip pattern 42 that is away from the first gate strip pattern 41; the tenth connection hole pattern 510 is located in the first active region pattern 11 at a side of the fourth gate strip pattern 44 that is away from the third gate strip pattern 43; the eleventh connection hole pattern 5111 is located at the first side of the first pattern region 10 and spaced apart from the fourth active region pattern 14, and the eleventh connection hole pattern 5111 is electrically connected to the first metal contact pattern 21; and the twelfth connection hole pattern 5112 is located at the second side of the first pattern region 10 and spaced apart from the first active region pattern 11, and the twelfth connection hole pattern 5112 is electrically connected to the second metal contact pattern 22.

Figure 5:
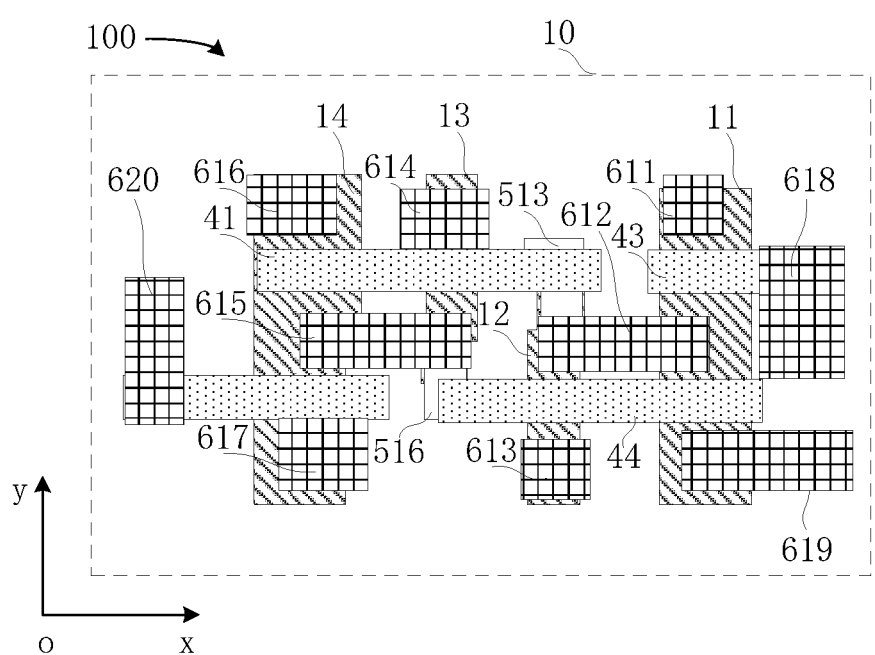
FIG. 5 is a schematic top view of a layout structure obtained in step S1 of a layout structure forming method of a sense amplifier according to another embodiment of the present disclosure.
Figure 6:
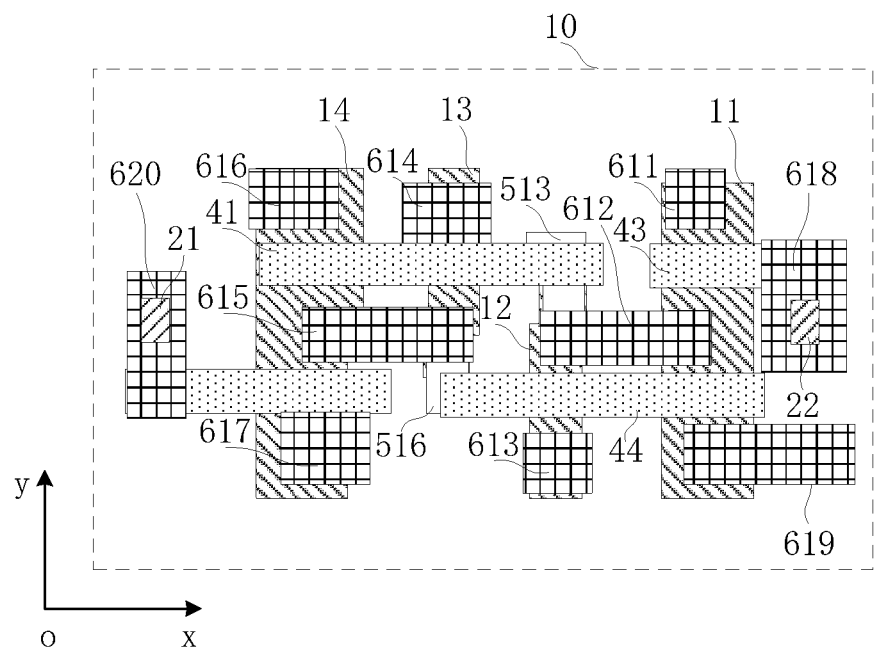
FIG. 6 is a schematic top view of a layout structure obtained in step S2 of a layout structure forming method of a sense amplifier according to an embodiment of the present disclosure.

Further, referring to FIG. 5 and FIG. 6, in an embodiment of the present disclosure, the layout structure forming method of a sense amplifier further includes: forming a second conductive wire pattern layer on an upper surface of the gate strip pattern layer, where the second conductive wire pattern layer includes a first conductive pattern 611, a second conductive pattern 612, a third conductive pattern 613, a fourth conductive pattern 614, a fifth conductive pattern 615, a sixth conductive pattern 616, a seventh conductive pattern 617, an eighth conductive pattern 618, a ninth conductive pattern 619, and a tenth conductive pattern 620. The first conductive pattern 611 covers the first connection hole pattern 511; the second conductive pattern 612 covers the second connection hole pattern 512 and a part of the third connection hole pattern 513; the third conductive pattern 613 covers the fourth connection hole pattern 514; the fourth conductive pattern 614 covers the fifth connection hole pattern 515; the fifth conductive pattern 615 covers a part of the sixth connection hole pattern 516 and the eighth connection hole pattern 518; the sixth conductive pattern 616 covers the seventh connection hole pattern 517; the seventh conductive pattern 617 covers the ninth connection hole pattern 519; the eighth conductive pattern 618 covers the twelfth connection hole pattern 5112 and the second metal contact pattern 22; the ninth conductive pattern 619 covers the tenth connection hole pattern 510; and the tenth conductive pattern 620 covers the eleventh connection hole pattern 5111 and the first metal contact pattern 21.

Figure 7:
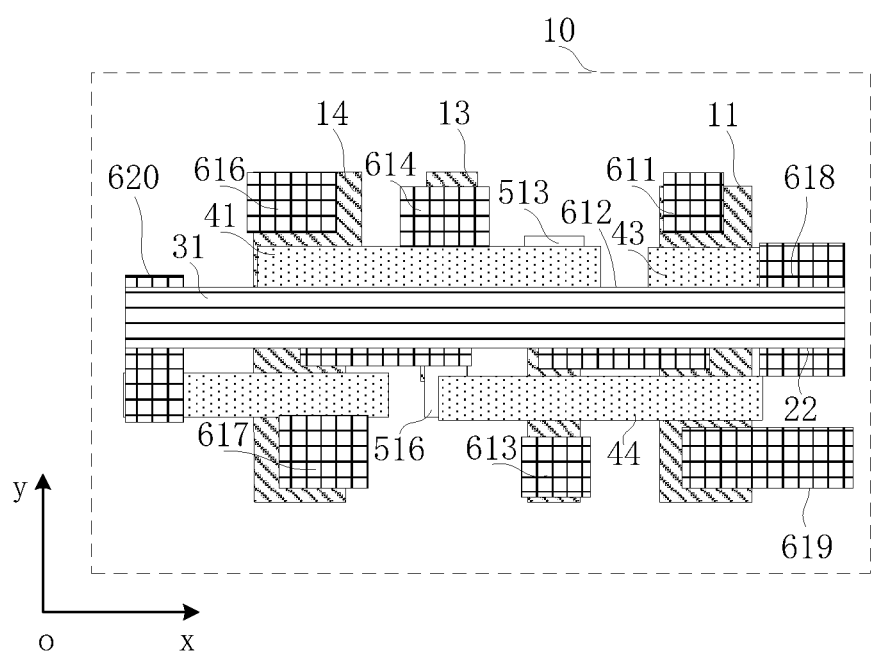
FIG. 7 is a schematic top view of a layout structure obtained in step S3 of a layout structure forming method of a sense amplifier according to an embodiment of the present disclosure.

Further, referring to FIG. 7, in an embodiment of the present disclosure, in step S3, the first conductive wire pattern layer is formed on the upper surface of the first metal contact pattern layer, where the first conductive wire pattern layer includes a first conductive wire pattern 31, and the first conductive wire pattern 31 extends along the first direction, e.g., direction ox, and covers the first metal contact pattern 21 and the second metal contact pattern 22.

Figure 8:
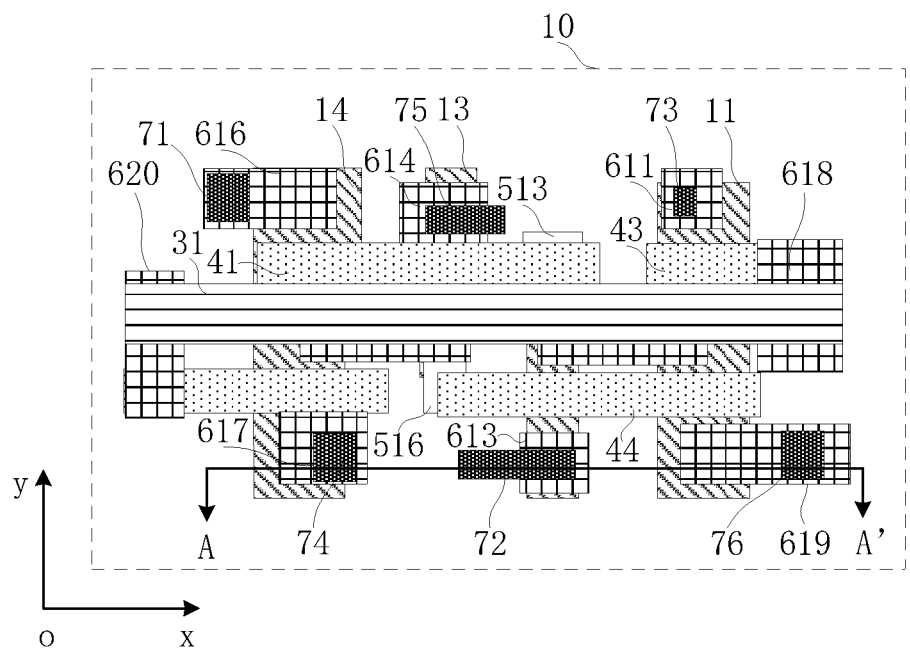
FIG. 8 is a schematic top view of a layout structure obtained in step S4 of a layout structure forming method of a sense amplifier according to an embodiment of the present disclosure.

For example, referring to FIG. 8, in an embodiment of the present disclosure, in step S4, the conductive wire pattern layer includes a first connection hole design 71, a second connection hole design 72, a third connection hole design 73, a fourth connection hole design 74, a fifth connection hole design 75, and a sixth connection hole design 76; the first connection hole design 71 is located in the sixth conductive pattern 616 at the first side of the first pattern region; the second connection hole design 72 overlaps with the third conductive pattern 613 and the second active region pattern 12; the third connection hole design 73 is located in the first conductive pattern 611 and overlaps with the first connection hole pattern 511; the fourth connection hole design 74 is located in the seventh conductive pattern 617 and overlaps with the ninth connection hole pattern 519; the fifth connection hole design 75 overlaps with the third active region pattern 13 and the fourth conductive pattern 614; and the sixth connection hole design 76 is located in the ninth conductive pattern 619 at the second side of the first pattern region. The first connection hole design 71 may correspond to the fifth MOS transistor, the second connection hole design 72 may correspond to the fourth MOS transistor, the third connection hole design 73 may correspond to the second MOS transistor, the fourth connection hole design 74 may correspond to the first MOS transistor, the fifth connection hole design 75 may correspond to the third MOS transistor, and the sixth connection hole design 76 may correspond to the sixth MOS transistor. A length of the first conductive wire pattern 31 along the second direction, e.g., direction oy, may be greater than or equal to a preset width threshold, to meet a width requirement. Because the first conductive wire pattern 31 is connected to the connection structure through the connection hole design, the width of the first conductive wire pattern 31 in the memory cell structure is increased, which reduces parasitic capacitance generated by conductive wires in a manufactured semiconductor device, improves the efficiency of data transmission in the semiconductor device, and reduces the energy consumption of the semiconductor device. With the first memory cell structure as a basic cell, a layout structure including the basic cell array is formed in a horizontal symmetrical manner and/or vertical symmetrical manner, which improves the uniformity of pattern shapes on the layout structure, reduces requirements on design rules for each layer of the layout structure, reduces the complexity of a lithography process, and expands a gap between adjacent conductive wires in a manufactured semiconductor product, such that the conductive wires are sufficiently copper-plated, thereby further reducing the resistance and parasitic capacitance of the conductive wires.

For example, further referring to FIG. 4 and FIG. 8, in an embodiment of the present disclosure, the first memory cell structure is a 6T SRAM.

For example, further referring to FIG. 8, in an embodiment of the present disclosure, the layout structure forming method of a sense amplifier further includes: providing a second memory cell structure, where the second memory cell structure and the first memory cell structure are symmetrically arranged along the first direction, e.g., direction ox, and the first memory cell structure shares the second metal contact pattern with the second memory cell structure.

For example, further referring to FIG. 8, in an embodiment of the present disclosure, the layout structure forming method of a sense amplifier further includes: providing a third memory cell structure and/or a fourth memory cell structure, where the third memory cell structure and the first memory cell structure are symmetrically arranged along a second direction, e.g., direction oy, and the fourth memory cell structure and the second memory cell structure are symmetrically arranged along the second direction, e.g., direction oy. The second direction may be perpendicular to the first direction, so as to form a layout structure including a plurality of memory cell structures, thereby reducing complexity of the layout structure design, and improving the yield and reliability of manufactured memory cell structure products.

For example, further referring to FIG. 6, FIG. 7 and FIG. 8, in an embodiment of the present disclosure, a layout structure of a sense amplifier is provided, including: a first active region layout structure layer, a first metal contact pattern layer, a first conductive wire pattern layer, and a first connection hole pattern layer, where the first active region layout structure layer includes a first pattern region for defining a first memory cell structure; the first metal contact pattern layer is located on an upper surface of the first active region layout structure layer, where the first metal contact pattern layer includes a first metal contact pattern 21 located at a first side of the first pattern region and a second metal contact pattern 22 located at a second side of the first pattern region, the first side and the second side being two opposite sides of the first pattern region along a first direction; the first conductive wire pattern layer is located on an upper surface of the first metal contact pattern layer, where the first conductive wire pattern layer includes a first conductive wire pattern, and the first conductive wire pattern extends along the first direction and covers the first metal contact pattern and the second metal contact pattern; and the first connection hole pattern layer is located on an upper surface of the first conductive wire pattern layer, where the first connection hole pattern layer includes a plurality of connection hole designs, the connection hole designs are arranged in a one-to-one corresponding manner with transistors in the first memory cell structure, and the connection hole designs are connected to form a connection structure that is connected to the first metal contact pattern layer. Because the first conductive wire pattern is connected to the connection structure through the connection hole design, the width of the first conductive wire pattern in the memory cell structure is increased, which reduces parasitic capacitance generated by conductive wires in a manufactured semiconductor device, improves the efficiency of data transmission in the semiconductor device, and reduces the energy consumption of the semiconductor device. With the first memory cell structure as a basic cell, a layout structure including the basic cell array is formed in a horizontal symmetrical manner and/or vertical symmetrical manner, which improves the uniformity of pattern shapes on the layout structure, reduces requirements on design rules for each layer of the layout structure, reduces the complexity of a lithography process, and expands a gap between adjacent conductive wires in a manufactured semiconductor product, such that the conductive wires are sufficiently copper-plated, thereby further reducing the resistance and parasitic capacitance of the conductive wires.

For example, further referring to FIG. 2 and FIG. 3, in an embodiment of the present disclosure, the first pattern region 10 further includes a first active region pattern 11, a second active region pattern 12, a third active region pattern 13, and a fourth active region pattern 14 that are sequentially arranged at intervals along the first direction, e.g., direction ox. The gate strip pattern layer includes a first gate strip pattern 41, a second gate strip pattern 42, a third gate strip pattern 43, and a fourth gate strip pattern 44. The first gate strip pattern 41 and the third gate strip pattern 43 are sequentially arranged at an interval along the first direction, e.g., direction ox; the second gate strip pattern 42 and the fourth gate strip pattern 44 are sequentially arranged at an interval along the first direction; the first gate strip pattern 41 and the second gate strip pattern 42 are sequentially arranged at an interval along a second direction, e.g., direction oy; the third gate strip pattern 43 and the fourth gate strip pattern 44 are sequentially arranged at an interval along the second direction. The first active region pattern 11 overlaps with the third gate strip pattern 43 and the fourth gate strip pattern 44; the second active region pattern 12 overlaps with the first gate strip pattern 41 and the fourth gate strip pattern 44; the third active region pattern 13 overlaps with the first gate strip pattern 41 and the fourth gate strip pattern 44; the fourth active region pattern 14 overlaps with the first gate strip pattern 41 and the second gate strip pattern 42.

For example, further referring to FIG. 4, in an embodiment of the present disclosure, a memory cell circuit is provided, including a first MOS transistor M1, a second MOS transistor M2, a third MOS transistor M3, a fourth MOS transistor M4, a fifth MOS transistor M5, and a sixth MOS transistor M6. A source of the third MOS transistor M3 and a source of the fourth MOS transistor M4 are both connected to a power line VDD. A source of the first MOS transistor M1 and a source of the second MOS transistor M2 are both connected to a ground line VSS. A drain of the third MOS transistor M3 is connected to a source of the first MOS transistor M1, a drain of the fifth MOS transistor M5, a gate of the fourth MOS transistor M4, and a gate of the sixth MOS transistor M6. A drain of the fourth MOS transistor M4 is connected to a source of the second MOS transistor M2, a drain of the sixth MOS transistor M6, a gate of the third MOS transistor M3, and a gate of the fifth MOS transistor M5. Gates of the first MOS transistor M1 and the second MOS transistor M2 are both connected to a word line WL. A drain of the first MOS transistor M1 is connected to a bit line BL, and a drain of the second MOS transistor M2 is connected to a complementary bit line BL.

For example, further referring to FIG. 5 and FIG. 6, in an embodiment of the present disclosure, the first active region layout structure layer further includes a second conductive wire pattern layer located on an upper surface of the gate strip pattern layer, where the second conductive wire pattern layer includes a first conductive pattern 611, a second conductive pattern 612, a third conductive pattern 613, a fourth conductive pattern 614, a fifth conductive pattern 615, a sixth conductive pattern 616, a seventh conductive pattern 617, an eighth conductive pattern 618, a ninth conductive pattern 619, and a tenth conductive pattern 620. The first conductive pattern 611 covers the first connection hole pattern 511; the second conductive pattern 612 covers the second connection hole pattern 512 and a part of the third connection hole pattern 513; the third conductive pattern 613 covers the fourth connection hole pattern 514; the fourth conductive pattern 614 covers the fifth connection hole pattern 515; the fifth conductive pattern 615 covers a part of the sixth connection hole pattern 516 and the eighth connection hole pattern 518; the sixth conductive pattern 616 covers the seventh connection hole pattern 517; the seventh conductive pattern 617 covers the ninth connection hole pattern 519; the eighth conductive pattern 618 covers the twelfth connection hole pattern 5112 and the second metal contact pattern 22; the ninth conductive pattern 619 covers the tenth connection hole pattern 510; and the tenth conductive pattern 620 covers the eleventh connection hole pattern 5111 and the first metal contact pattern 21.

For example, further referring to FIG. 8, in an embodiment of the present disclosure, the connection hole designs include a first connection hole design 71, a second connection hole design 72, a third connection hole design 73, a fourth connection hole design 74, a fifth connection hole design 75, and a sixth connection hole design 76; the first connection hole design 71 is located in the sixth conductive pattern 616 at the first side of the first pattern region; the second connection hole design 72 overlaps with the third conductive pattern 613 and the second active region pattern 12; the third connection hole design 73 is located in the first conductive pattern 611 and overlaps with the first connection hole pattern 511; the fourth connection hole design 74 is located in the seventh conductive pattern 617 and overlaps with the ninth connection hole pattern 519; the fifth connection hole design 75 overlaps with the third active region pattern 13 and the fourth conductive pattern 614; and the sixth connection hole design 76 is located in the ninth conductive pattern 619 at the second side of the first pattern region. The first connection hole design 71 may correspond to the fifth MOS transistor, the second connection hole design 72 may correspond to the fourth MOS transistor, the third connection hole design 73 may correspond to the second MOS transistor, the fourth connection hole design 74 may correspond to the first MOS transistor, the fifth connection hole design 75 may correspond to the third MOS transistor, and the sixth connection hole design 76 may correspond to the sixth MOS transistor. A length of the first conductive wire pattern 31 along the second direction, e.g., direction oy, may be greater than or equal to a preset width threshold, to meet a width requirement.

Figure 9A:
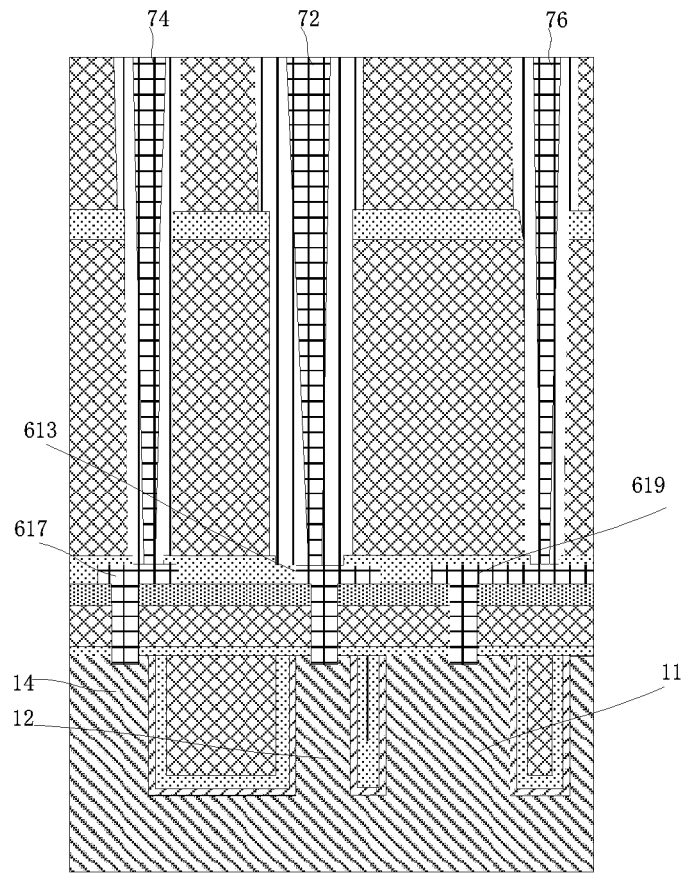
FIG. 9A is a schematic structural diagram of a cross section taken along direction AA' in FIG. 8.
Figure 9B:
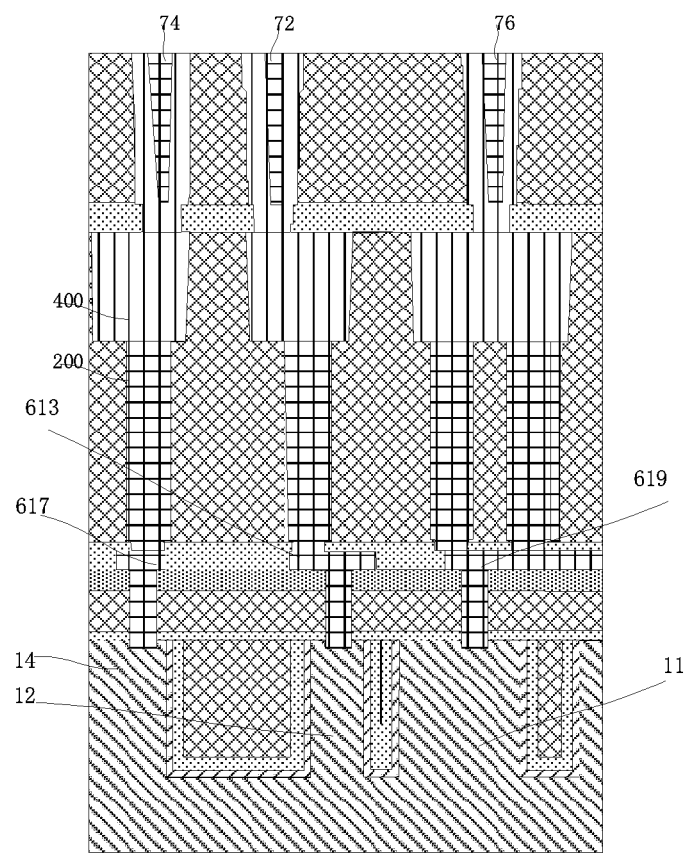
FIG. 9B is a schematic structural diagram of a cross section of a layout structure of a conventional sense amplifier taken along direction AA' in FIG. 8.

Referring to FIG. 8, FIG. 9a, and FIG. 9b, FIG. 9a is a schematic structural diagram of a cross section taken along direction AA' in FIG. 8. The fourth connection hole design 74, the second connection hole design 72, or the sixth connection hole design 76 is directly connected to the seventh conductive pattern 617, the third conductive pattern 613, or the ninth conductive pattern 619 respectively. Compared with the conventional semiconductor structure in which the fourth connection hole design 74, the second connection hole design 72 or the sixth connection hole design 76 is respectively connected to the seventh conductive pattern 617, the third conductive pattern 613, or the ninth conductive pattern 619 through a transit structure 400 and a connection structure 200 as shown in FIG. 9b, the technical solution provided in the present disclosure can increase the width of the first conductive wire pattern 31 in the memory cell structure, which reduces parasitic capacitance generated by conductive wires in a manufactured semiconductor device, improves the efficiency of data transmission in the semiconductor device, and reduces the energy consumption of the semiconductor device. With the first memory cell structure as a basic cell, a layout structure including the basic cell array is formed in a horizontal symmetrical manner and/or vertical symmetrical manner, which improves the uniformity of pattern shapes on the layout structure, reduces requirements on design rules for each layer of the layout structure, reduces the complexity of a lithography process, and expands a gap between adjacent conductive wires in a manufactured semiconductor product, such that the conductive wires are sufficiently copper-plated, thereby further reducing the resistance and parasitic capacitance of the conductive wires.

It may be noted that the foregoing embodiments are merely for the purpose of description instead of limiting the present disclosure.

It should be understood that the execution order of the steps is not strictly limited, and the steps may be executed in other orders, unless clearly described otherwise. Moreover, at least some of the steps may include a plurality of sub-steps or stages. The sub-steps or stages are not necessarily executed at the same time, but may be executed at different times. The execution order of the sub-steps or stages is not necessarily carried out sequentially, but may be executed alternately with other steps or at least some of the sub-steps or stages of other steps.

The embodiments of this specification are described in a progressive manner, and each embodiment focuses on differences from other embodiments. The same or similar parts between the embodiments may refer to each other.

The technical features of the above examples can be employed in arbitrary combinations. To provide a concise description of these examples, all possible combinations of all technical features of the embodiment may not be described; however, these combinations of technical features should be construed as disclosed in the description as long as no contradiction occurs.

Only several implementations of the present disclosure are described in detail in the foregoing embodiments, but they should not therefore be construed as limiting the scope of the present disclosure. It should be noted that those of ordinary skill in the art can further make variations and improvements without departing from the conception of the present disclosure. These variations and improvements all fall within the protection scope of the present disclosure. Therefore, the protection scope of the present disclosure should be subject to the protection scope defined by the claims.

The invention claimed is:

1. A layout structure forming method of a sense amplifier, comprising:
   providing a first active region layout structure layer, wherein the first active region layout structure layer comprises a first pattern region for defining a first memory cell structure;
   forming a first metal contact pattern layer on an upper surface of the first active region layout structure layer, wherein the first metal contact pattern layer comprises a first metal contact pattern located at a first side of the first pattern region and a second metal contact pattern located at a second side of the first pattern region, the first side and the second side being two opposite sides of the first pattern region along a first direction;
   forming a first conductive wire pattern layer on an upper surface of the first metal contact pattern layer, wherein the first conductive wire pattern layer comprises a first conductive wire pattern, and the first conductive wire pattern extends along the first direction and covers the first metal contact pattern and the second metal contact pattern; and
   forming a first connection hole pattern layer on an upper surface of the first conductive wire pattern layer, wherein the first connection hole pattern layer comprises a plurality of connection hole designs, the connection hole designs are arranged in a one-to-one corresponding manner with transistors in the first memory cell structure, and the connection hole designs are connected to form a connection structure that is connected to the first metal contact pattern layer;
   the method further comprises:
   providing a second memory cell structure, wherein the second memory cell structure and a first memory cell structure are symmetrically arranged along the first direction, and the first memory cell structure shares the second metal contact pattern with the second memory cell structure.

2. The layout structure forming method of a sense amplifier according to claim 1, the method further comprises:
   providing a third memory cell structure and/or a fourth memory cell structure, wherein the third memory cell structure and the first memory cell structure are symmetrically arranged along a second direction, and the fourth memory cell structure and the second memory cell structure are symmetrically arranged along the second direction.

3. The layout structure forming method of a sense amplifier according to claim 1, wherein the providing a first active region layout structure layer comprises:
   providing a first active region pattern layer, wherein the first active region pattern layer comprises a first active region pattern, a second active region pattern, a third active region pattern, and a fourth active region pattern that are sequentially arranged at an interval along the first direction;
   forming a second connection hole pattern layer on an upper surface of the first active region pattern layer; and
   forming a gate strip pattern layer on an upper surface of the second connection hole pattern layer, wherein the gate strip pattern layer comprises a first gate strip pattern, a second gate strip pattern, a third gate strip pattern, and a fourth gate strip pattern; the first gate strip pattern and the third gate strip pattern are sequentially arranged at an interval along the first direction; the second gate strip pattern and the fourth gate strip pattern are sequentially arranged at an interval along the first direction; the first gate strip pattern and the second gate strip pattern are sequentially arranged at an interval along a second direction; and the third gate strip pattern and the fourth gate strip pattern are sequentially arranged at an interval along the second direction;

wherein the first active region pattern overlaps with the third gate strip pattern and the fourth gate strip pattern, the second active region pattern overlaps with the first gate strip pattern and the fourth gate strip pattern, the third active region pattern overlaps with the first gate strip pattern and the fourth gate strip pattern, and the fourth active region pattern overlaps with the first gate strip pattern and the second gate strip pattern.

4. The layout structure forming method of a sense amplifier according to claim 3, wherein the first gate strip pattern and the fourth active region pattern, which is located at both sides of the first gate strip pattern along the second direction, are used for forming a fifth metal-oxide semiconductor (MOS) transistor; the second gate strip pattern and the fourth active region pattern, which is located at both sides of the second gate strip pattern along the second direction, are used for forming a first MOS transistor; the first gate strip pattern and the third active region pattern, which is located at both sides of the first gate strip pattern along the second direction, are used for forming a third MOS transistor; the fourth gate strip pattern and the second active region pattern, which is located at both sides of the fourth gate strip pattern along the second direction, are used for forming a fourth MOS transistor; the third gate strip pattern and the first active region pattern, which is located at both sides of the third gate strip pattern along the second direction, are used for forming a second MOS transistor; and the fourth gate strip pattern and the first active region pattern, which is located at both sides of the fourth gate strip pattern along the second direction, are used for forming a sixth MOS transistor.

5. The layout structure forming method of a sense amplifier according to claim 3, wherein the second connection hole pattern layer comprises a first connection hole pattern, a second connection hole pattern, a third connection hole pattern, a fourth connection hole pattern, a fifth connection hole pattern, a sixth connection hole pattern, a seventh connection hole pattern, an eighth connection hole pattern, a ninth connection hole pattern, a tenth connection hole pattern, an eleventh connection hole pattern, and a twelfth connection hole pattern;

the first connection hole pattern is located in the first active region pattern at a side of the third gate strip pattern that is away from the fourth gate strip pattern;

the second connection hole pattern is located in the first active region pattern between the third gate strip pattern and the fourth gate strip pattern;

the third connection hole pattern covers a first overlapping region formed by the second active region pattern and the first gate strip pattern;

the fourth connection hole pattern is located in the second active region pattern at a side of the fourth gate strip pattern that is away from the first gate strip pattern;

the fifth connection hole pattern is located in the third active region pattern at a side of the first gate strip pattern that is away from the fourth gate strip pattern;

the sixth connection hole pattern covers a second overlapping region formed by the third active region pattern and the fourth gate strip pattern;

the seventh connection hole pattern is located in the fourth active region pattern at a side of the first gate strip pattern that is away from the second gate strip pattern;

the eighth connection hole pattern is located in the fourth active region pattern between the first gate strip pattern and the second gate strip pattern;

the ninth connection hole pattern is located in the fourth active region pattern at a side of the second gate strip pattern that is away from the first gate strip pattern;

the tenth connection hole pattern is located in the first active region pattern at a side of the fourth gate strip pattern that is away from the third gate strip pattern;

the eleventh connection hole pattern is located at the first side of the first pattern region and spaced apart from the fourth active region pattern, and the eleventh connection hole pattern is electrically connected to the first metal contact pattern; and the twelfth connection hole pattern is located at the second side of the first pattern region and spaced apart from the first active region pattern, and the twelfth connection hole pattern is electrically connected to the second metal contact pattern.

6. The layout structure forming method of a sense amplifier according to claim 5, wherein the providing a first active region layout structure layer further comprises:

forming a second conductive wire pattern layer on an upper surface of the gate strip pattern layer, wherein the second conductive wire pattern layer comprises a first conductive pattern, a second conductive pattern, a third conductive pattern, a fourth conductive pattern, a fifth conductive pattern, a sixth conductive pattern, a seventh conductive pattern, an eighth conductive pattern, a ninth conductive pattern, and a tenth conductive pattern;

the first conductive pattern covers the first connection hole pattern;

the second conductive pattern covers the second connection hole pattern and a part of the third connection hole pattern;

the third conductive pattern covers the fourth connection hole pattern;

the fourth conductive pattern covers the fifth connection hole pattern;

the fifth conductive pattern covers a part of the sixth connection hole pattern and the eighth connection hole pattern;

the sixth conductive pattern covers the seventh connection hole pattern;

the seventh conductive pattern covers the ninth connection hole pattern;

the eighth conductive pattern covers the twelfth connection hole pattern and the second metal contact pattern;

the ninth conductive pattern covers the tenth connection hole pattern; and the tenth conductive pattern covers the eleventh connection hole pattern and the first metal contact pattern.

7. The layout structure forming method of a sense amplifier according to claim 6, wherein the connection hole designs comprise a first connection hole design, a second connection hole design, a third connection hole design, a fourth connection hole design, a fifth connection hole design, and a sixth connection hole design;

the first connection hole design is located in the sixth conductive pattern at the first side of the first pattern region;

the second connection hole design overlaps with the third conductive pattern and the second active region pattern;

the third connection hole design is located in the first conductive pattern and overlaps with the first connection hole pattern;

the fourth connection hole design is located in the seventh conductive pattern and overlaps with the ninth connection hole pattern;

the fifth connection hole design overlaps with the third active region pattern and the fourth conductive pattern; and the sixth connection hole design is located in the ninth conductive pattern at the second side of the first pattern region.

8. The layout structure forming method of a sense amplifier according to claim 1, wherein a length of the first conductive wire pattern in a second direction is greater than or equal to a preset width threshold.

9. The layout structure forming method of a sense amplifier according to claim 1, wherein the first memory cell structure is a 6T static random access memory (SRAM).

10. A layout structure of a sense amplifier, comprising:

a first active region layout structure layer, wherein the first active region layout structure layer comprises a first pattern region for defining a first memory cell structure;

a first metal contact pattern layer, located on an upper surface of the first active region layout structure layer, wherein the first metal contact pattern layer comprises a first metal contact pattern located at a first side of the first pattern region and a second metal contact pattern located at a second side of the first pattern region, the first side and the second side being two opposite sides of the first pattern region along a first direction;

a first conductive wire pattern layer, located on an upper surface of the first metal contact pattern layer, wherein the first conductive wire pattern layer comprises a first conductive wire pattern, and the first conductive wire pattern extends along the first direction and covers the first metal contact pattern and the second metal contact pattern; and a first connection hole pattern layer, located on an upper surface of the first conductive wire pattern layer, wherein the first connection hole pattern layer comprises a plurality of connection hole designs, the connection hole designs are arranged in a one-to-one corresponding manner with transistors in the first memory cell structure, and the connection hole designs are connected to form a connection structure that is connected to the first metal contact pattern layer;

the layout structure of the sense amplifier further comprises:

a second memory cell structure, symmetrically arranged with a first memory cell structure along the first direction, wherein the first memory cell structure shares the second metal contact pattern with the second memory cell structure.

11. The layout structure of a sense amplifier according to claim 10, the layout structure of the sense amplifier further comprises:

a third memory cell structure, symmetrically arranged with the first memory cell structure along a second direction; and/or a fourth memory cell structure, symmetrically arranged with the second memory cell structure along the second direction.

12. The layout structure of a sense amplifier according to claim 10, wherein the first active region layout structure layer comprises:

a first active region pattern layer, wherein the first active region pattern layer comprises a first active region pattern, a second active region pattern, a third active region pattern, and a fourth active region pattern that are sequentially arranged at an interval along the first direction;

a second connection hole pattern layer, located on an upper surface of the first active region pattern layer, wherein the second connection hole pattern layer comprises a first connection hole pattern, a second connection hole pattern, a third connection hole pattern, a fourth connection hole pattern, a fifth connection hole pattern, a sixth connection hole pattern, a seventh connection hole pattern, an eighth connection hole pattern, a ninth connection hole pattern, a tenth connection hole pattern, an eleventh connection hole pattern, and a twelfth connection hole pattern; and a gate strip pattern layer, located on an upper surface of the second connection hole pattern layer, wherein the gate strip pattern layer comprises a first gate strip pattern, a second gate strip pattern, a third gate strip pattern, and a fourth gate strip pattern, the first gate strip pattern and the third gate strip pattern are sequentially arranged at an interval along the first direction; the second gate strip pattern and the fourth gate strip pattern are sequentially arranged at an interval along the first direction; the first gate strip pattern and the second gate strip pattern are sequentially arranged at an interval along a second direction; and the third gate strip pattern and the fourth gate strip pattern are sequentially arranged at an interval along the second direction;

wherein the first active region pattern overlaps with the third gate strip pattern and the fourth gate strip pattern, the second active region pattern overlaps with the first gate strip pattern and the fourth gate strip pattern, the third active region pattern overlaps with the first gate strip pattern and the fourth gate strip pattern, and the fourth active region pattern overlaps with the first gate strip pattern and the second gate strip pattern.

13. The layout structure of a sense amplifier according to claim 12, wherein the first gate strip pattern and the fourth active region pattern, which is located at both sides of the first gate strip pattern along the second direction, are used for forming a fifth MOS transistor; the second gate strip pattern and the fourth active region pattern, which is located at both sides of the second gate strip pattern along the second direction, are used for forming a first MOS transistor; the first gate strip pattern and the third active region pattern, which is located at both sides of the first gate strip pattern along the second direction, are used for forming a third MOS transistor; the fourth gate strip pattern and the second active region pattern, which is located at both sides of the fourth gate strip pattern along the second direction, are used for forming a fourth MOS transistor; the third gate strip pattern and the first active region pattern, which is located at both sides of the third gate strip pattern along the second direction, are used for forming a second MOS transistor; and the fourth gate strip pattern and the first active region pattern, which is located at both sides of the fourth gate strip pattern along the second direction, are used for forming a sixth MOS transistor.

14. The layout structure of a sense amplifier according to claim 12, wherein the second connection hole pattern layer comprises a first connection hole pattern, a second connection hole pattern, a third connection hole pattern, a fourth connection hole pattern, a fifth connection hole pattern, a sixth connection hole pattern, a seventh connection hole pattern, an eighth connection hole pattern, a ninth connection hole pattern, a tenth connection hole pattern, an eleventh connection hole pattern, and a twelfth connection hole pattern;
- the first connection hole pattern is located in the first active region pattern at a side of the third gate strip pattern that is away from the fourth gate strip pattern;
- the second connection hole pattern is located in the first active region pattern between the third gate strip pattern and the fourth gate strip pattern;
- the third connection hole pattern covers a first overlapping region formed by the second active region pattern and the first gate strip pattern;
- the fourth connection hole pattern is located in the second active region pattern at a side of the fourth gate strip pattern that is away from the first gate strip pattern;
- the fifth connection hole pattern is located in the third active region pattern at a side of the first gate strip pattern that is away from the fourth gate strip pattern;
- the sixth connection hole pattern covers a second overlapping region formed by the third active region pattern and the fourth gate strip pattern;
- the seventh connection hole pattern is located in the fourth active region pattern at a side of the first gate strip pattern that is away from the second gate strip pattern;
- the eighth connection hole pattern is located in the fourth active region pattern between the first gate strip pattern and the second gate strip pattern;
- the ninth connection hole pattern is located in the fourth active region pattern at a side of the second gate strip pattern that is away from the first gate strip pattern;
- the tenth connection hole pattern is located in the first active region pattern at a side of the fourth gate strip pattern that is away from the third gate strip pattern;
- the eleventh connection hole pattern is located at the first side of the first pattern region and spaced apart from the fourth active region pattern, and the eleventh connection hole pattern is electrically connected to the first metal contact pattern; and
- the twelfth connection hole pattern is located at the second side of the first pattern region and spaced apart from the first active region pattern, and the twelfth connection hole pattern is electrically connected to the second metal contact pattern.

15. The layout structure of a sense amplifier according to claim 12, wherein the first active region layout structure layer further comprises:
- a second conductive wire pattern layer, located on an upper surface of the gate strip pattern layer, wherein the second conductive wire pattern layer comprises a first conductive pattern, a second conductive pattern, a third conductive pattern, a fourth conductive pattern, a fifth conductive pattern, a sixth conductive pattern, a seventh conductive pattern, an eighth conductive pattern, a ninth conductive pattern, and a tenth conductive pattern;
- the first conductive pattern covers the first connection hole pattern;
- the second conductive pattern covers the second connection hole pattern and a part of the third connection hole pattern;
- the third conductive pattern covers the fourth connection hole pattern;
- the fourth conductive pattern covers the fifth connection hole pattern;
- the fifth conductive pattern covers a part of the sixth connection hole pattern and the eighth connection hole pattern;
- the sixth conductive pattern covers the seventh connection hole pattern;
- the seventh conductive pattern covers the ninth connection hole pattern;
- the eighth conductive pattern covers the twelfth connection hole pattern and the second metal contact pattern;
- the ninth conductive pattern covers the tenth connection hole pattern; and
- the tenth conductive pattern covers the eleventh connection hole pattern and the first metal contact pattern.

16. The layout structure of a sense amplifier according to claim 15, wherein the connection hole designs comprise a first connection hole design, a second connection hole design, a third connection hole design, a fourth connection hole design, a fifth connection hole design, and a sixth connection hole design;
- the first connection hole design is located in the sixth conductive pattern at the first side of the first pattern region;
- the second connection hole design overlaps with the third conductive pattern and the second active region pattern;
- the third connection hole design is located in the first conductive pattern and overlaps with the first connection hole pattern;
- the fourth connection hole design is located in the seventh conductive pattern and overlaps with the ninth connection hole pattern;
- the fifth connection hole design overlaps with the third active region pattern and the fourth conductive pattern; and
- the sixth connection hole design is located in the ninth conductive pattern at the second side of the first pattern region.

17. The layout structure of a sense amplifier according to claim 10, wherein a length of the first conductive wire pattern in a second direction is greater than or equal to a preset width threshold.

* * * * *